Figure 1:
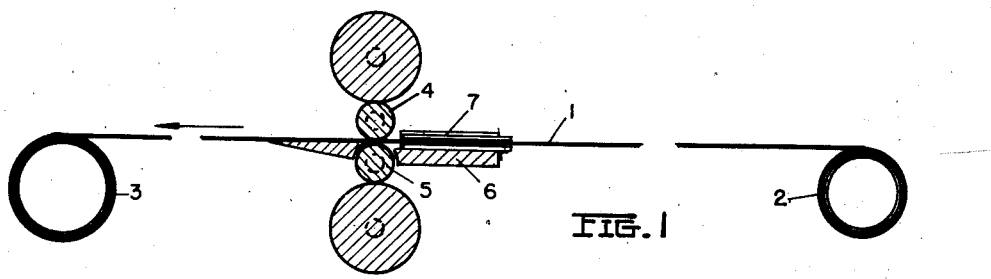

Aug. 3, 1943.  E. M. BRANGLE ET AL  2,325,738
TRAVELING STRIP GUIDE
Filed May 31, 1941

INVENTORS
EDWARD M. BRANGLE and
VINCENT W. KOLASINSKI
BY Oberlin, Limbach & Day.
ATTORNEYS Patented Aug. 3, 1943

2,325,738

UNITED STATES PATENT OFFICE 2,325,738

TRAVELING STRIP GUIDE

Edward M. Brangle, Newburgh Heights, and Vincent W. Kolasinski, Garfield Heights, Ohio Application May 31, 1941, Serial No. 395,960

3 Claims. (Cl. 80—51)

The present invention relates to a guide which is adapted to contact lateral edges of strip material, such as steel strip, as the latter is fed into a metal-working machine, such as a rolling mill. The device of our present invention embodies certain improvements over that set forth in our prior U. S. Patent No. 2,185,657.

Such prior device comprised essentially a channel-shaped bar or holding member in which a bar or wear member of relatively softer material such as brass, was removably inserted. This wear member was intended to be removed and re-inserted in the channel-shaped holding member after each time a portion of its surface had become worn or grooved by reason of contact with the traveling steel strip.

One of the objects of our present invention is to provide means whereby the wear member need be removed and re installed with respect to the holding member only once during the normal period of use of the wear member. In other words, according to the principle of our present invention, it is possible to present eight new and unworn surfaces of the wear member for contact with and guiding action upon the steel strip, while removing and re-inserting the wear member only once in the holding or clamping device.

Another object of the invention is to provide relieved portions on each end of the wear member which eliminate the tendency to form a burr thereon by the action of the traveling steel strip, and which, together with complementary seating surfaces on the clamping members, function to lock the wear member against longitudinal movement with respect to the clamping members, eliminating the necessity of additional fasteners, such as dowel pins, bolts and the like.

Still another object of the invention is to taper the ends of the clamping members on those sides of the latter lying in a plane parallel to the exposed wear surface of the wear member, so that the projecting ends of the clamping members are disposed well out of the path of the traveling steel strip and unlikely to cause any contact which might damage one or the other.

A further object of our invention is to provide a longitudinal recess in those spaces of the clamping members which are adjacent the wear member so that any unevenness or roughness caused by previous wear contact on such surface will not throw the wear member out of proper alignment when clamped in new position in the clamping members.

Yet another object of the invention is to provide a simplified form of quick-acting and positive locking means for holding the guide against both longitudinal and lateral movement on the frame of the metal-working machine or mill.

To the accomplishment of the foregoing and related ends, said invention, then consists of the means hereinafter fully described and particularly pointed out in the claims. The annexed drawing and the following description set forth in detail certain mechanism embodying the invention, such disclosed means constituting, however, but one of various mechanical forms in which the principle of the invention may be used.

Figure 2:
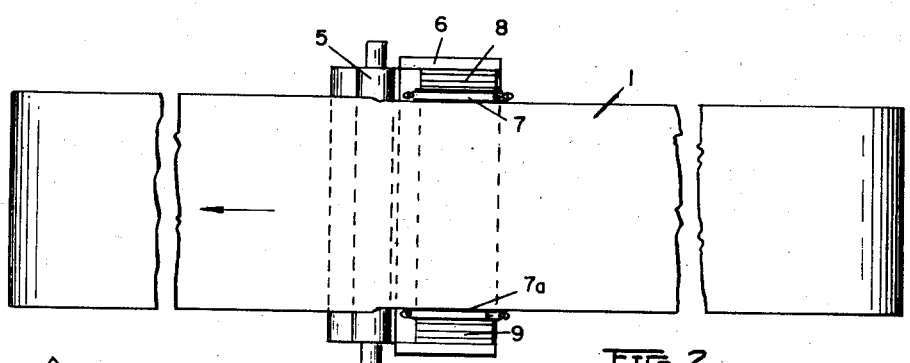
Figure 3:
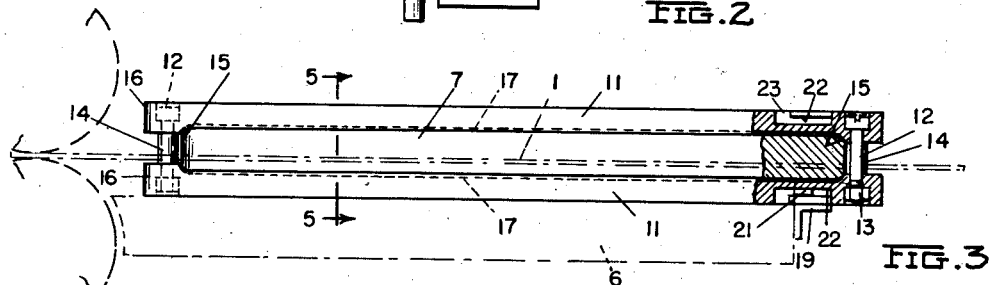
Figure 4:
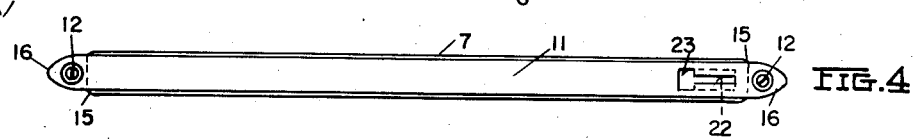
Figures 5, 6:
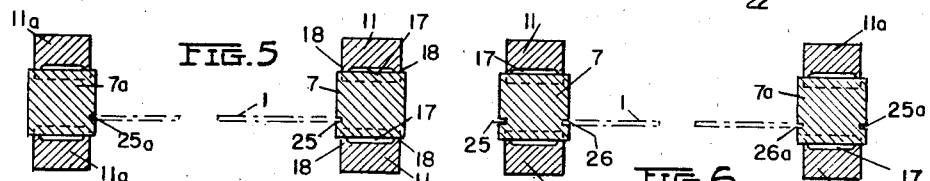
Figure 7:
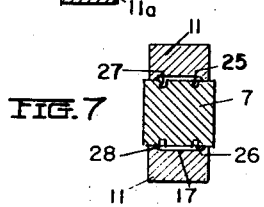
Figure 8:
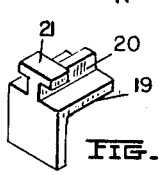

In said annexed drawing:

Fig. 1 is an elevational view illustrating the device of our invention as installed on a 4-high sheet rolling mill; Fig. 2 is a top plan view of Fig. 1; Fig. 3 is an enlarged, side elevational view, partially in section, of the strip guide; Fig. 4 is a top plan view of Fig. 3; Fig. 5 is a sectional view taken substantially along line 5—5 of Fig. 3; Fig. 6 is a sectional view similar to Fig. 5 but showing the guide members in interchanged position to present a new wear surface to the action of the steel strip; Fig. 7 is another sectional view through the guide but showing the wear member in its re-inserted or changed position in the clamping members; and Fig. 8 is a perspective view of the locking lug for retaining the guide on the frame of the mill.

Now referring more particularly to the drawing, there is shown therein a steel strip 1 which travels from the feed coil 2 to the delivery coil 3 and between the working rolls 4 and 5 of a 4-high mill. A table 6 is located on the front or entrance end of the 4-high mill and the strip guides 7 and 7a are mounted upon this table in such position as to contact with the lateral edges of the traveling steel strip 1. It is customary to place filler blocks, such as the filler blocks 8 and 9, behind the guides 7 and 7a, to hold the latter in firm contact against the edges of the strip.

As will be seen from the detailed views, Figs. 3 to 8, inc., the guide construction comprises an elongated, bar-shaped wear member 7 of square, cross-sectional form which is clamped between the holding members 11. The holding members or clamping bars 11 are of rectangular cross-section and of slightly less width than that of the wear bar 7 (which is composed of a material relatively softer than that of the strip 1, e. g., brass, where the strip 1 is of steel). The clamping bars 11, however, are of greater length than that of the wear bar 7 so that they project beyond the latter at each end and are clamped or held together in clamping position upon the bar 7 by means of suitable removable fasteners such as the cap screws 12 and nuts 13. Spacing sleeves 14 are located on the cap screws 12 intermediate the bars 11, and function to limit the amount of clamping pressure which can be exerted, as well as to hold the bars 11 in spaced relationship during removal and insertion of the wear bar 7.

The ends of the wear bar 7 are relieved or rounded off on each side at points immediately adjacent the end, as indicated at 15. A complementary shoulder or seat is provided on the opposed, inner faces of the clamping bars 11 for fitting over the relieved ends 15. This latter construction has a dual purpose; (1) to lock the wear bar 7 against longitudinal movement with respect to the clamping bars 11, and (2) to prevent the formation of a burr or flash on the end of the wear bar. We have found that the action of the steel strip 1, as it passes over the trailing edge of the wear member (viz., the lefthand end with respect to Fig. 3) causes a building up or removed metal and a flaring of the wear groove when such edge of the wear bar is a sharp, rectangular one. The rounding off or relieving of the edge, as indicated at 15, of our wear bar 7, counteracts this difficulty.

Referring to Fig. 4, it will be seen that the outwardly projecting ends of the clamping bars 11 are tapered down to a narrow end, as indicated at 16, and in a plane parallel to the strip contacting surface of the wear bar 7. Thus, if the strip 1 should be inadvertently moved up or down on the wear bar 7, there is no likelihood of the strip 1 suffering damaging contact with the projecting ends of the clamping bars 11.

Referring to Figs. 5, 6 and 7, it will be seen that longitudinal recesses 17 are provided in the inner or opposed faces of the clamping bars 11. Thus, the clamping bars 11 contact with the side faces of the wear bar 7 at the points 18 adjacent the outer edges of the bars 11, leaving a clearance space in the intermediate portion. This clearance space, as particularly shown in Fig. 7, overlies the wear grooves 25, 26, 27 and 28 previously imparted to the wear bar 7, so that any unevenness or roughness caused on the side face of the bar 7 by the presence of these grooves will not disturb the proper aligned and uniform engagement of the clamping bars 11 with the sides of the bar 7.

A locking device for attaching the assembled clamping bars 11 and wear bar 7 upon the frame member 6 of the mill, comprises the bracket 19 having the upstanding lug or web 20 and the transversely projecting head 21. Slots 22 are provided in each one of the clamping bars 11, adjacent one end of the latter, for receiving the lug 20 and head 21. The opening 23 in the slot 22 is of sufficient dimensions to receive the head 21, and locking action is effected by longitudinal movement of the clamping members 11 with respect to the locking lug.

Figs. 5, 6 and 7 illustrate the manner in which my above described guide is operable to present 8 different wear surfaces for guiding contact with the steel strip 1, with only one removal and re-insertion of the wear bar 7 with respect to the clamping members 11. Thus, in Fig. 5, the strip 1 is shown in the position in which it has worn a groove in the adjacent guide members 7 and 7a. To present a new wear surface, each one of the complete guide elements are transposed from one side to the other of the steel strip 1, without unclamping the wear bars 7 and 7a in their respective clamping bars 11a. Thus, the grooves 25 and 25a are first worn in the wear members 7 and 7a; the grooves 26 and 26a are next imparted to the wear members 7 and 7a in the second position, and then by turning the guides upside down with respect to the positions in which they are shown in Figs. 5 and 6, respectively, the grooves 27 and 28 will be additionally worn into the surface of each of the wear bars. At this point, each of the wear bars 7 and 7a are removed from the clamping members 11, rotated through 90° and re-inserted in the position shown in Fig. 7, to present two more unworn side faces which can be presented for wearing action by the strip 1, in the same manner as just previously described, making a total of 8 wear surfaces presented for contacting action, with only once removing and re-inserting the wear bars 7 and 7a in their respective clamping members 11 and 11a.

Although our invention has been illustrated and described as applied to a rolling mill, it should be apparent to those skilled in the art, that our guide might equally well be applied to similar metal strip handling, working and fabricating operation, where it is desired to guide a traveling strip in a fixed path.

Other modes of applying the principle of our invention may be employed instead of the one explained, change being made as regards the mechanism herein disclosed, provided the means stated by any of the following claims or the equivalent of such stated means be employed.

We, therefore, particularly point out and distinctly claim as our invention:

1. A guide for traveling strips, comprising an elongated wear member of square, cross-sectional shape, a pair of holding members adapted to be mounted on opposite sides of said wear member, means for clamping said holding members against said opposite sides, said holding members being of substantially rectangular cross-section of less width than that of said wear member and having longitudinal, marginal bearing surfaces forming the sole contact with the flat side surfaces of said wear member and a longitudinal recess between said surfaces to provide a clearance space between a portion of said opposite sides of said wear member and said marginal bearing surfaces.

2. A guide for traveling strips, comprising an elongated wear member of square, cross-sectional shape, each outer end portion thereof being relieved on each side to a lesser perimeter, a pair of holding members adapted to be mounted on opposite sides of said wear member, the ends of said holding members extending longitudinally beyond the ends of said wear member, complementary shoulders on each of said ends of said holding members for fitting over and receiving said relieved outer end portions, means for clamping said holding members against said opposite sides, said holding members being of substantially rectangular cross-section of less width than that of said wear member and having longitudinal, marginal bearing surfaces forming the sole contact with the flat side surfaces of said wear member and a longitudinal recess between said surfaces to provide a clearance space between a portion of said opposite sides of said wear member and said marginal bearing surfaces.

3. A guide for traveling strips in a steel strip mill, comprising an elongated wear member of square, cross-sectional shape, each outer end portion thereof being relieved on each side to a lesser perimeter, a pair of holding members adapted to be mounted on opposite sides of said wear member, the ends of said holding members extending longitudinally beyond the ends of said wear member, complementary shoulders on each of said ends of said holding members for fitting over and receiving said relieved outer end portions, means for clamping said holding members against said opposite sides, said holding members being of substantially rectangular cross-section of less width than that of said wear member and having longitudinal, marginal bearing surfaces forming the sole contact with the flat side surfaces of said wear member and a longitudinal recess between said surfaces to provide a clearance space between a portion of said opposite sides of said wear member and said marginal bearing surfaces, a headed locking lug on the supporting frame of said mill, a recess in the sides of each of said holding members for receiving the head of said locking lug, said extending ends of said holding members being tapered to a narrow end on those sides thereof which are parallel to the strip contacting face of said wear member when in clamped position.

EDWARD M. BRANGLE.
VINCENT W. KOLASINSKI.